US007454172B2

(12) United States Patent
Kurita et al.

(10) Patent No.: US 7,454,172 B2
(45) Date of Patent: Nov. 18, 2008

(54) WIRELESS BASE STATION AND TERMINAL USING COMBO OF DIFFERENT WIRELESS SYSTEMS

(75) Inventors: Shigeru Kurita, Kanagawa (JP); Yoshikazu Kobayashi, Kanagawa (JP)

(73) Assignee: NEC Infrontia Corporation (JP)

( * ) Notice: Subject to any disclaimer, the term of this patent is extended or adjusted under 35 U.S.C. 154(b) by 1180 days.

(21) Appl. No.: 10/677,375

(22) Filed: Oct. 3, 2003

(65) Prior Publication Data

US 2004/0102220 A1 May 27, 2004

(30) Foreign Application Priority Data

Nov. 27, 2002 (JP) ............................ 2002-344005

(51) Int. Cl.
*H04B 17/00* (2006.01)

(52) U.S. Cl. .................................... 455/67.11; 455/561

(58) Field of Classification Search ............. 455/67.11, 455/67.13, 63.1, 63.3, 552.1, 553.1, 561, 455/575.7, 575.1, 550.1, 522
See application file for complete search history.

(56) References Cited

U.S. PATENT DOCUMENTS 5,771,468 A * 6/1998 Stein .......................... 455/561
6,928,266 B1 * 8/2005 Nevo et al. ................. 455/63.3
7,158,773 B2 * 1/2007 Kurita et al. ................ 455/307
2001/0051530 A1 * 12/2001 Shiotsu et al. .............. 455/522

FOREIGN PATENT DOCUMENTS

| | | |
|---|---|---|
| JP | 06-013959 | 1/1994 |
| JP | 11-205322 | 7/1999 |
| JP | 11-308159 | 11/1999 |
| JP | 2000-082986 | 3/2000 |
| JP | 2000-261857 | 9/2000 |
| JP | 2001-217764 | 8/2001 |
| JP | 2001-257621 | 9/2001 |
| JP | 2001-345756 | 12/2001 |
| JP | 2002-271241 | 9/2002 |
| WO | WO-02/091683 A1 | 11/2002 |

* cited by examiner

*Primary Examiner*—Lewis G West
(74) *Attorney, Agent, or Firm*—Dickstein, Shapiro, LLP.

(57) ABSTRACT

If a PHS wireless LAN combo is constituted in which a PHS base station and a wireless LAN base station are placed in the same case, their frequency bands are different but they interfere with each other due to an influence of higher harmonics, which decreases communication efficiency. When a PHS base station is in a transmitting state and a wireless LAN base station is in a receiving state, a transmission signal from the PHS base station is multiplied by a predetermined attenuation ratio so as to subtract an attenuated value from a received signal of the wireless LAN base station, and when the wireless LAN base station is in a transmitting state and the PHS base station is in a receiving state, a transmission signal from the wireless LAN base station is multiplied by the predetermined attenuation ratio so as to subtract an attenuated value from a received signal of the PHS base station.

7 Claims, 4 Drawing Sheets

PHS
(STANDBY)
INITIAL CONTROL SIGNAL
AFTER POWER IS APPLIED
125ms
130ms
CONTROL SIGNAL
BEACON(5ms)

WIRELESS LAN
NaV
PCF PERIOD
DCF PERIOD
NaV
GUARD TIME(10ms)

WIRELESS BASE STATION AND TERMINAL USING COMBO OF DIFFERENT WIRELESS SYSTEMS

BACKGROUND OF THE INVENTION

1. Field of the Invention

The present invention relates to a wireless base station and terminal using a combo of different wireless systems so as to prevent mutual radio wave interference, and more particularly to a PHS wireless LAN combo in which a PHS (Personal Handyphone System) base station and a wireless LAN (Local Area Network) base station are placed together in the same case and a PHS wireless LAN terminal.

2. Description of the Related Art

Recently, in an office, for example, a PHS base station has been installed for telephones and a wireless LAN base station has been installed for data communications in order to make telephone calls and perform data communications. In such a case, it is advantageous in terms of installation place and installation cost if the PHS base station and wireless LAN base station are placed in the same case as a combo.

A PHS system and a wireless LAN system have a different frequency band of 1.9 GHz and 2.4 GHz, respectively, but it is believed that when a combo is applied where they are accommodated in the came case, they interfere with each other, decreasing communication efficiency due to influences such as higher harmonics.

To prevent such a decrease in the communication efficiency, some means needs to be employed to eliminate the mutual interference between the base stations. For example, in JP-A-H11-308159, a reproduction intermediary device for elimination of local station wraparound interference is described to which an AGC (Automatic Gain Control) time constant switch method is applied.

The prior art teaches cancellation of the local station wraparound interference, but there has not been a technique for eliminating interference in different frequency bands or in different communication methods.

SUMMARY OF THE INVENTION

The present invention has been attained in view of the foregoing prior art problems, and its object is to provide to a PHS wireless LAN combo and a PHS wireless LAN terminal that can ensure elimination of mutual radio wave interference without regard to different frequency bands and different communication methods.

In order to achieve the above object, the present invention provides A wireless base station comprising: a first and second base stations for transmitting and receiving signals having a different frequency band respectively, the first and second base stations being placed in the same case as a combo; first subtraction means for, when the first base station is in a transmitting state and said second base station is in a receiving state, subtracting an attenuated value from a received signal of the second base station, said attenuated value being obtained by multiplying a transmission signal from the first base station by a predetermined attenuation ratio; and second subtraction means for, when the second base station is in a transmitting state and the first base station is in a receiving state, subtracting an attenuated value from a received signal of the first base station, the attenuated value being obtained by a transmission signal from the second base station by the predetermined attenuation ratio.

Furthermore, the present invention provides A wireless base station comprising: a first and second base stations for transmitting and receiving signals having a different frequency band respectively, the first and second base stations being placed in the same case as a combo; means for detecting transmission/receiving of one of said first and second base stations; and means for controlling transmission/receiving of the other of the first and second base stations so that it is performed out of timing with a transmission time of the one of said first and second base stations when the one of said first and second base stations is on standby.

Still further, the present invention provides A wireless terminal comprising: a first and second transmitting/receiving sections for transmitting and receiving a signal having a different frequency band; first subtraction means for, when the first transmitting/receiving section is in a transmitting state and the second transmitting/receiving section is in a receiving state, subtracting an attenuated value from a received signal of the second transmitting/receiving section, the attenuated value being obtained by multiplying a transmission signal from said first transmitting/receiving section by a predetermined attenuation ratio; and second subtraction means for, when the second transmitting/receiving section is in a transmitting state and said first transmitting/receiving section is in a receiving state, subtracting an attenuated value from a received signal of the first transmitting/receiving section, the attenuated value being obtained by multiplying a transmission signal from said second transmitting/receiving section by the predetermined attenuation ratio.

DETAILED DESCRIPTION OF THE PREFERRED EMBODIMENTS

Next, embodiments of the present invention will be described in detail in reference to the drawings.

First Embodiment

Figure 1:
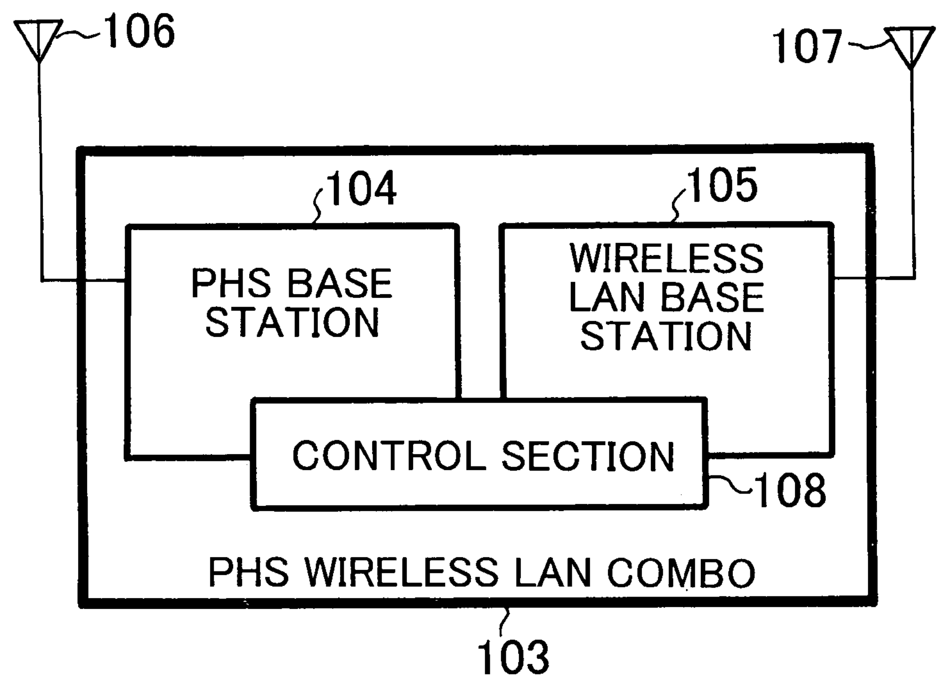
FIG. 1 is a block diagram showing a schematic configuration of a PHS wireless LAN combo in a first embodiment according to the present invention.

FIG. 1 is a block diagram showing a schematic configuration of a PHS wireless LAN combo in a first embodiment according to the present invention. In FIG. 1, 103 denotes the PHS wireless LAN combo in which a PHS base station 104 and a wireless LAN base station 105 are placed in the same case. The PHS base station 104 and wireless LAN base station 105 are configured in the same way as conventionally known base stations and will not be described in detail. 106 denotes an antenna of the PHS base station 104, and 107 denotes an antenna of the wireless LAN base station 105.

Furthermore, 108 denotes a control section which controls the PHS base station 104 and wireless LAN base station 105. As will be described later in detail, the control section 108 controls to prevent mutual radio wave interference between the PHS base station 104 and the wireless LAN base station 105 when the PHS base station 104 is in a transmitting state and the wireless LAN base station 105 is in a receiving state or when the wireless LAN base station 105 is in a transmitting state and the PHS is in a receiving state.

Figure 2:
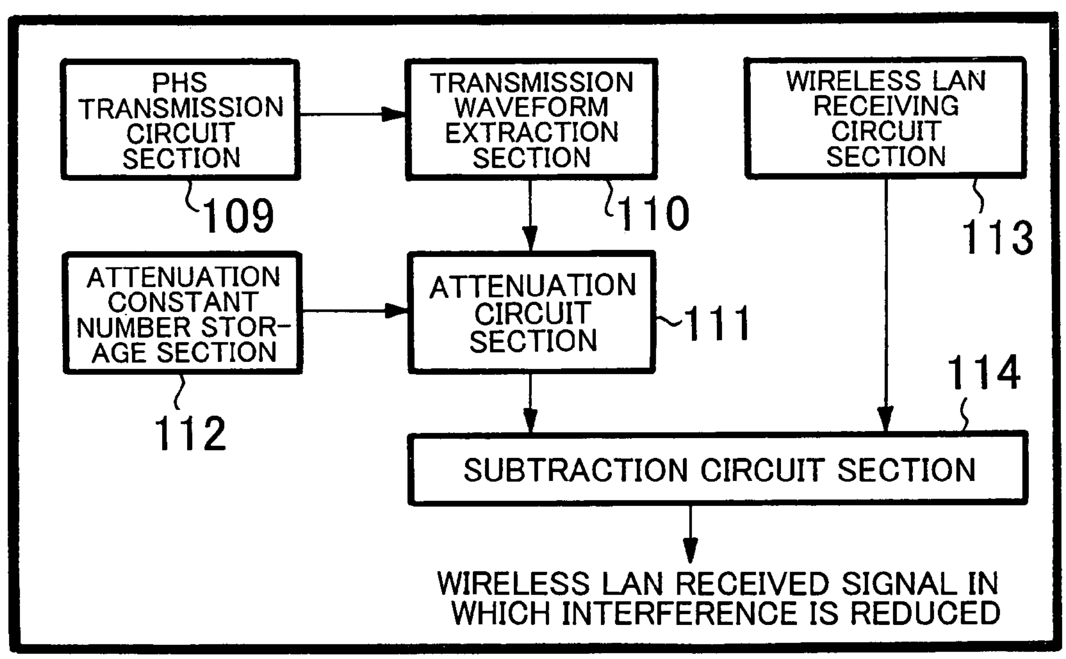
FIG. 2 is a block diagram showing an interference elimination circuit in the embodiment of FIG. 1.
Figure 3:
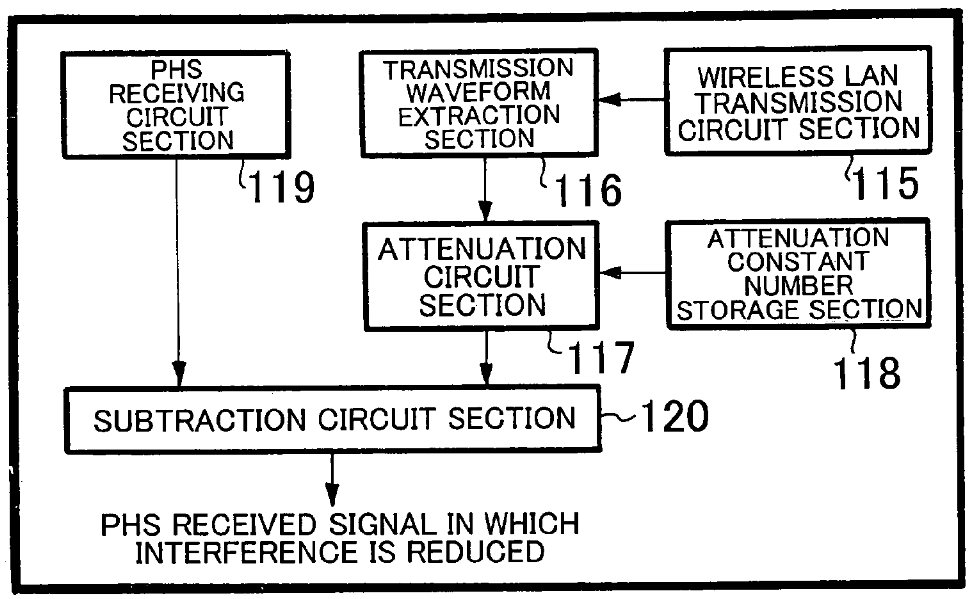
FIG. 3 is a block diagram showing an interference elimination circuit in the embodiment of FIG. 1.

FIG. 2 and FIG. 3 show interference elimination circuits of the wireless LAN combo. FIG. 2 shows a circuit which eliminates an influence of a transmission signal from the PHS base station mixed in a wireless LAN received signal, and FIG. 3 shows a circuit which eliminates an influence of a transmission signal of the wireless LAN mixed in a PHS received signal. The interference elimination circuits in the circuits of FIG. 2 and FIG. 3 are provided in the control section 108.

The circuit of FIG. 2 will first be described. A PHS transmission circuit section 109 is provided in the PHS base station 104, and is a transmission circuit which transmits PHS signals. A transmission waveform extraction section 110 extracts a transmission signal from the PHS transmission circuit section 109. 111 denotes an attenuation circuit section which attenuates a signal extracted by the transmission waveform extraction section 110 with a predetermined constant number (attenuation ratio), and 112 denotes an attenuation constant number storage section which stores the constant number.

Furthermore, 113 denotes a wireless LAN receiving circuit section which is provided in the wireless LAN base station 105 and receives wireless LAN signals. A subtraction circuit section 114 subtracts a signal attenuated by the attenuation circuit section 111 from a received signal of the wireless LAN receiving circuit section 113, thereby eliminating the influence of the transmission signal from the PHS base station 104 mixed in the wireless LAN received signal.

Next, the interference elimination circuit of FIG. 3 will be described. First, a wireless LAN transmission circuit section 115 is provided in the wireless LAN base station 105, and is a transmission circuit which transmits wireless LAN signals. A transmission waveform extraction section 116 extracts a transmission signal from the wireless LAN transmission circuit section 115. 117 denotes an attenuation circuit section which multiplies a signal extracted by the transmission waveform extraction section 116 by a predetermined constant number (attenuation ratio) so as to attenuate the extracted signal, and 118 denotes an attenuation constant number storage section which stores the constant number.

Furthermore, 119 denotes a PHS receiving circuit section which is provided in the PHS base station 104 and receives PHS signals. A subtraction circuit section 120 subtracts a signal attenuated by the attenuation circuit section 117 from a signal received by the PHS receiving circuit section 119, thereby eliminating the influence of the transmission signal from the wireless LAN base station 105 mixed in the PHS received signal.

Next, an operation in the present embodiment will be described. First, as it is possible to know transmission waveforms of the PHS and wireless LAN in the PHS wireless LAN combo of the present embodiment, this is utilized to eliminate the influence of the transmission signal of the PHS base station 104 by subtracting a value, which is obtained by multiplying the transmission signal of the PHS base station 104 by the predetermined attenuation ratio, from the wireless LAN received signal of the wireless LAN base station 105, when the PHS base station 104 is in a transmitting state and the wireless LAN base station 105 is in a receiving state. This can be expressed by Computation equation (1).

$$D=A-(B\times C) \tag{1}$$

where A is a received signal level of the wireless LAN base station 105, B is a transmission signal level of the PHS base station 104, C is the predetermined attenuation ratio, and D is the received signal in which interference is eliminated.

This operation will be specifically described in reference to FIG. 2. First, a PHS transmission signal from the PHS transmission circuit section 109 is extracted by the transmission waveform extraction section 110, and then input to the attenuation circuit section 111 where it is multiplied by the predetermined attenuation ratio and thereby attenuated. The predetermined constant number mentioned here is, for example, a constant number which minimizes the influence of the transmission waveform of the PHS mixed in the wireless LAN received signal, and this is obtained by experiment at a design phase and stored in the attenuation constant number storage section 112.

Furthermore, the subtraction circuit section 114 subtracts the PHS transmission signal attenuated by the attenuation circuit section 111 from the wireless LAN received signal received by the wireless LAN receiving circuit section 113, thereby making it possible to take out the wireless LAN received signal from which the influence of the PHS transmission signal is eliminated.

Furthermore, when the wireless LAN base station 105 is in a transmitting state and the PHS base station 104 is in a receiving state, similarly, the value obtained by multiplying the transmission signal of the wireless LAN base station 105 by the predetermined attenuation ratio is subtracted from the PHS receiving signal of the PHS base station 104, thereby eliminating the influence of the transmission signal of the wireless LAN base station 105. This can be expressed by Computation equation (2).

$$H=E-(F\times G) \tag{2}$$

where E is a received signal level of the PHS base station 104, F is a transmission signal level of the wireless LAN base station 105, G is the predetermined attenuation ratio, and H is the received signal in which interference is eliminated.

This operation will be described in reference to FIG. 3. First, a wireless LAN transmission signal of the wireless LAN transmission circuit section 115 is extracted by the transmission waveform extraction section 116, and then input to the attenuation circuit section 117 where it is multiplied by the predetermined constant number and thereby attenuated. The predetermined constant number is, for example, a constant number which minimizes the influence of the transmission waveform of the wireless LAN base station 105 mixed in the received signal of the PHS base station 104, and this is obtained by experiment at the design phase and stored in the attenuation constant number storage section 118.

Furthermore, the subtraction circuit section 120 subtracts the wireless LAN transmission signal attenuated by the attenuation circuit section 117 from the PHS received signal received by the PHS receiving circuit section 119, thereby making it possible to take out the PHS received signal from which the influence of the wireless LAN transmission signal is eliminated. It should be noted that the transmission/receiving state of the PHS base station 104 and that of the wireless LAN base station 105 are detected by a transmission/receiving detection section (not shown) in the control section 108, and mutual interference between the PHS base station 104 and the wireless LAN base station 105 is eliminated on the basis of a detection result as described above.

Second Embodiment

Figure 4:
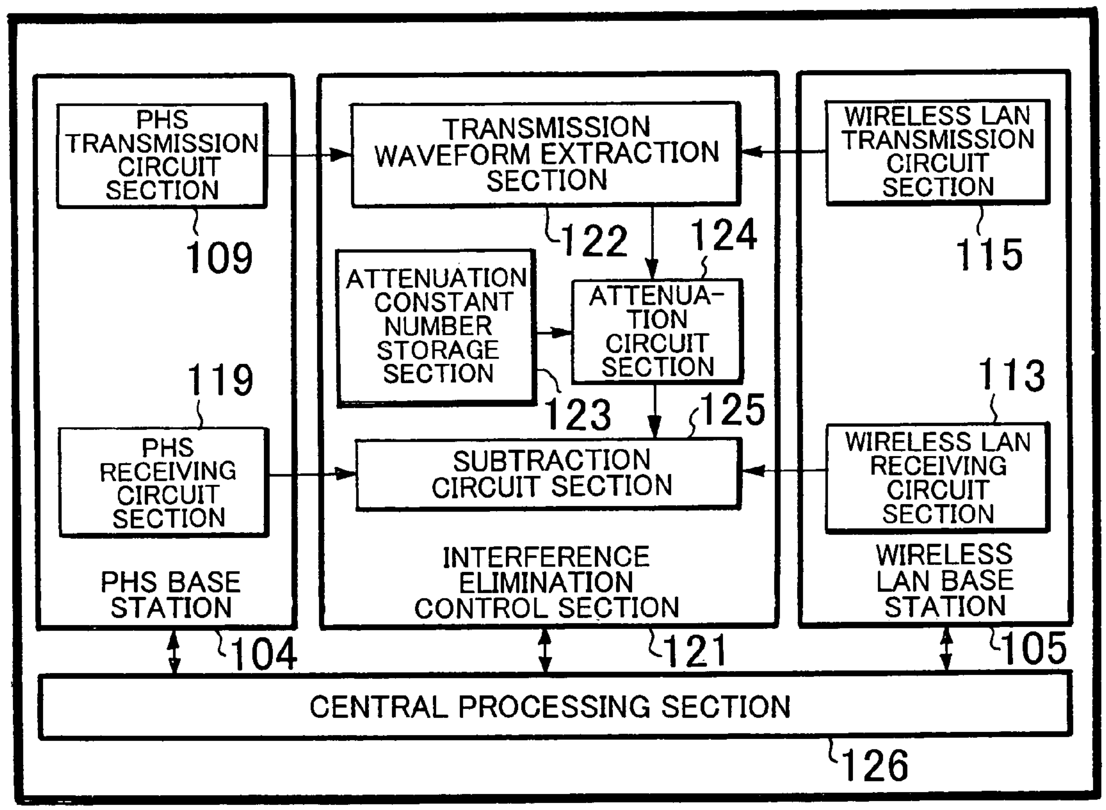
FIG. 4 is a block diagram showing a second embodiment of the present invention.

FIG. 4 is a block diagram showing a second embodiment of the PHS wireless LAN combo according to the present invention. The same parts as those in FIG. 1 to FIG. 3 of the first embodiment are given the same numerals in FIG. 4 and will not be described. In the present embodiment, the PHS base station 104 and the wireless LAN base station 105 are placed in the same case as in the first embodiment. Further, a central processing section 126 is provided which controls an interference elimination control section 121, interference elimination control section 121 that are equivalent to those in FIG. 2 and FIG. 3. The central processing section 126 executes calculation for each control, detects the transmission/receiving state of the PHS base station 104 and that of the wireless LAN base station 105, and controls the interference elimination control section 121 on the basis of a detection result.

The interference elimination control section 121 has a function of eliminating the influence of the PHS base station 105 when the PHS base station 104 is in a transmitting state and the wireless LAN base station 105 is in a receiving state, and eliminating the influence of the wireless LAN base station 105 when the wireless LAN base station 105 is in a transmitting state and the PHS base station 104 is in a receiving state, as in the first embodiment. The interference elimination control section 121 is constituted of a transmission waveform extraction section 122, an attenuation constant number storage section 123, an attenuation circuit section 124 and a subtraction circuit section 125.

The transmission waveform extraction section 122 has functions of both the transmission waveform extraction sections 110 and 116 in FIG. 2 and FIG. 3, the attenuation constant number storage section 123 has functions of both the attenuation constant number storage sections 112 and 118, the attenuation circuit section 124 has functions of both the attenuation circuit sections 111 and 117, and the subtraction circuit section 125 has functions of both the subtraction circuit sections 114 and 120. These sections operate in the same way as in the first embodiment when the PHS base station 104 is in a transmitting state and the wireless LAN base station 105 is in a receiving state and when the wireless LAN base station 105 is in a transmitting state and the PHS base station 104 is in a receiving state, thereby eliminating the mutual influence of the base stations.

Furthermore, in the present embodiment, the central processing section 126 detects a transmission time or receiving time of the PHS base station 104 and of the wireless LAN base station 105, respectively, and on the basis of this detection result controls the interference elimination control section 121 to stop its operation except when the PHS base station 104 is in a transmitting state and the wireless LAN base station 105 is in a receiving state and except when the wireless LAN base station 105 is in a transmitting state and the PHS base station 104 is in a receiving state. In addition, a power supply of the interference elimination control section 121 may be shut off. This control makes it possible to save electrical power and reduce loads on the central processing section 126.

Third Embodiment

Figure 5:
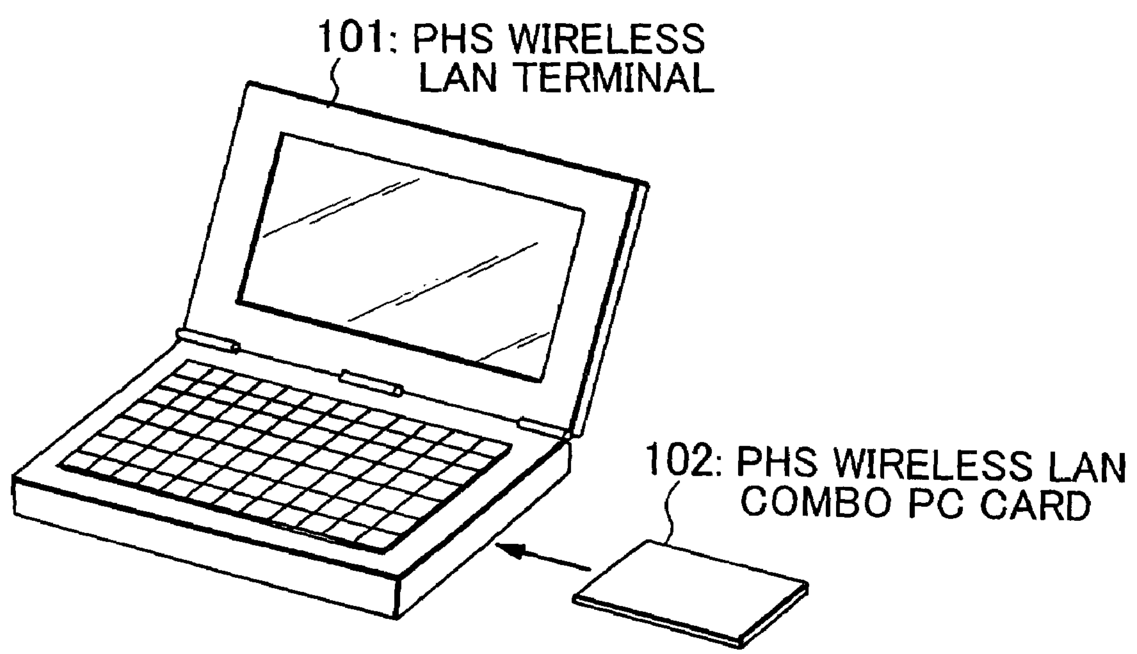
FIG. 5 is a diagram showing a third embodiment of the present invention.

Next, a third embodiment of the present invention will be described. In the third embodiment, interference elimination in the first and second embodiments described above is used for the PHS wireless LAN terminal. FIG. 5 is a schematic perspective view showing a schematic configuration of the PHS wireless LAN terminal according to the present embodiment. Inside a PHS wireless LAN terminal 101, a PHS transmission/receiving section (not shown) which transmits/receives signals of the PHS and a wireless LAN transmission/receiving section (not shown) which transmits/receives signals of the wireless LAN are disposed.

Furthermore, a PHS wireless LAN combo PC card 102 is equipped with interference elimination functions (interference elimination in FIG. 2 and FIG. 3) in the first embodiment or an interference elimination function (interference elimination in FIG. 4) in the second embodiment. With the PC card 102 having the interference elimination functions in the first and second embodiments, the PHS transmission/receiving section and the wireless LAN transmission/receiving section can eliminate the mutual influence of transmission signals even when they are located together in the same terminal. In addition, it is possible to save electrical power and reduce loads on the central processing section if the interference elimination of the second embodiment is provided.

Fourth Embodiment

Next, a fourth embodiment of the present invention will be described. Usually, the PHS base station is only transmitting control signals at intervals of 130 ms while it is on standby, so that a PCF (Point Coordination Function) defined by a wireless LAN standard (IEEE802.11) can be used as an example to synchronize the wireless LAN with the PHS, also in the wireless LAN base station. In this way, the wireless LAN transmits/receives out of timing with the transmission/receiving time of the PHS, thereby enabling the prevention of PHS interference. In this case, interference elimination as in the first and second embodiments is not needed. However, if the PHS changes from a standby state to a communication state, the interference elimination of the first and second embodiments is needed.

Figures 6A, 6B:
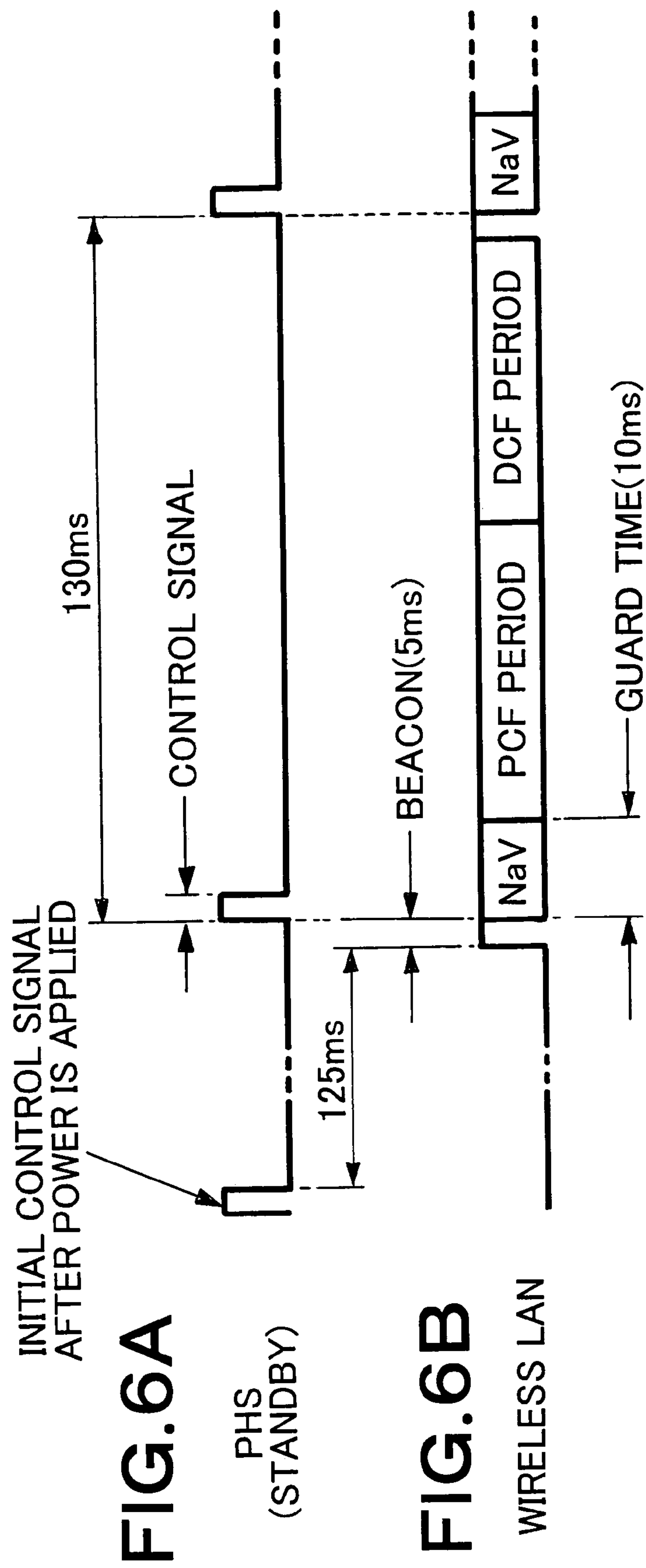
FIG. 6 are timing charts illustrating a fourth embodiment of the present invention.

Specifically, while the PHS base station is on standby as shown in FIG. 6(*a*), such an operation is performed that control signals are sent to the terminal in a cycle of 130 ms. Since the control signal is within 5 ms, transmission/receiving do not take place at the PHS for about 125 ms. This period is utilized to perform transmission/receiving in such timing that the wireless LAN is synchronized with the PHS by the wireless LAN base station in accordance with the PCF method as shown in FIG. 6(*b*), thereby making it possible to avoid such a situation that the wireless LAN receives while the PHS is transmitting or the PHS receives when the wireless LAN is transmitting.

At this moment, in the PCF method, a reference beacon signal is transmitted from the base station to the terminal, but information contained in the beacon allows the terminal to be informed of an interval before the beacon and the timing in which the base station and terminal transmit/receive, so that the interval of the beacon is set to 130 ms in line with the PHS and a NaV (Network allocation Vector) is set which does not allow transmission/receiving to take place immediately after the beacon, thereby providing a guard time in which the wireless LAN does not transmit and receive in synchronization with the PHS and while the PHS is transmitting a control signal. In other words, the period for the NaV is set to 5 ms, which is the period of the PHS control signal, or more, and a control is made at the wireless LAN base station so that the PHS control signal is transmitted during the NaV period, thereby making it possible to completely separate the timing of the PHS transmission/receiving from that of the wireless LAN transmission/receiving.

Here, for example, an operation will be described in the case where the configuration of the present embodiment is employed for the PHS wireless LAN combo in which the PHS base station 104 and the wireless LAN base station 105 are placed in the same case as shown in FIG. 4. In addition, the interference elimination control section 121 is not necessary in this case. First, the wireless LAN base station 105 communicates by use of the PCF method as described above.

The central processing section 126 detects the transmission/receiving of the PHS base station 104, and when detecting standby time of the PHS base station 104, that is, a falling edge of the control signal of the PHS base station 104 as shown in FIG. 6(*a*), the central processing section 126, for example, instructs the wireless LAN base station 105 to transmit a beacon after 125 ms as shown in FIG. 6(*b*), and then 10 ms is secured as a NaV period after 5-ms transmission of the beacon, so that the wireless LAN base station 105 does not perform any transmission/receiving during a control signal transmission period of the PHS base station 104 but the wireless LAN base station 105 perform transmission/receiving when the PHS base station 104 is put on standby for transmission/receiving. The central processing section 126 also performs control for ensuring the guard time (NaV) as described above.

In this way, the central processing section 126 controls the transmission/receiving of the wireless LAN base station 105 so that it is performed out of timing with the transmission time of the PHS base station 104 when the PHS base station 104 is on standby, thereby readily enabling the communication of the wireless LAN base station without the influence of the PHS base station.

As described above, according to the present invention, the influence of the PHS is eliminated when the PHS is in a transmitting state and the wireless LAN is in a receiving state, while the influence of the wireless LAN is eliminated when wireless LAN is in a transmitting state and the PHS is in a receiving state, thereby making it possible to eliminate the mutual influence and bringing about an effect of preventing communication efficiency decrease even when the PHS and the wireless LAN are placed in the same case.

Furthermore, when the PHS and the wireless LAN are not in a receiving state, interference elimination operation can be stopped to save electric power or reduce loads on a CPU and to prevent a decrease in overall performance.

Still further, the wireless LAN base station is controlled to perform receiving when the PHS base station is on standby so as to avoid the transmission time of the PHS base station, whereby the wireless LAN can communicate without being influenced by the PHS.

What is claimed is:

1. A wireless base station comprising:

a first and second base stations for transmitting and receiving signals having a different frequency band respectively, said first and second base stations being placed in the same case as a combo;

first subtraction means for, when said first base station is in a transmitting state and said second base station is in a receiving state, subtracting an attenuated value from a received signal of said second base station, said attenuated value being obtained by multiplying a transmission signal from said first base station by a predetermined attenuation ratio; and second subtraction means for, when said second base station is in a transmitting state and said first base station is in a receiving state, subtracting an attenuated value from a received signal of said first base station, said attenuated value being obtained by multiplying a transmission signal from said second base station by the predetermined attenuation ratio.

2. The wireless base station according to claim 1, wherein operations of said first and second subtraction means are stopped except when said first station is in a transmitting state and said second base station is in a receiving state, or except when said second base station is in a transmitting state and said first base station is in a receiving state.

3. The wireless base station according to claim 1, wherein said first base station is a PHS base station, and said base station is a wireless LAN base station.

4. A wireless terminal comprising:

a first and second transmitting/receiving sections for transmitting and receiving a signal having a different frequency band;

first subtraction means for, when said first transmitting/receiving section is in a transmitting state and said second transmitting/receiving section is in a receiving state, subtracting an attenuated value from a received signal of said second transmitting/receiving section, said attenuated value being obtained by multiplying a transmission signal from said first transmitting/receiving section by a predetermined attenuation ratio; and second subtraction means for, when said second transmitting/receiving section is in a transmitting state and said first transmitting/receiving section is in a receiving state, subtracting an attenuated value from a received signal of said first transmitting/receiving section, said attenuated value being obtained by multiplying a transmission signal from said second transmitting/receiving section by the predetermined attenuation ratio.

5. The wireless terminal according to claim 4, wherein operations of said first and second subtraction means are stopped except when said first transmission/receiving section is in a transmitting state and said second transmission/receiving section is in a receiving state, or except when said second transmission/receiving section is in a transmitting state and said first transmission/receiving section is in a receiving state.

6. The wireless terminal according to claim 4, wherein said first transmission/receiving section is a PHS transmission/receiving section for transmitting and receiving a PHS signal, and said second transmission/receiving section is a wireless LAN transmission/receiving section for transmitting and receiving a wireless LAN signal.

7. A wireless system comprising:

a wireless base station; and a wireless terminal for transmitting a signal to said wireless base station and for receiving a signal from said wireless base station;

wherein said wireless base station comprises:

a first and second base stations for transmitting and receiving signals having a different frequency band respectively, said first and second base stations being placed in the same case as a combo;

first subtraction means for, when said first base station is in a transmitting state and said second base station is in a receiving state, subtracting an attenuated value from a received signal of said second base station, said attenuated value being obtained by multiplying a transmission signal from said first base station by a predetermined attenuation ratio; and second subtraction means for, when said second base station is in a transmitting state and said first base station is in a receiving state, subtracting an attenuated value from a received signal of said first base station, said attenuated value being obtained by multiplying a transmission signal from said second base station by the predetermined attenuation ratio, and wherein said wireless terminal comprises:

a first and second transmitting/receiving sections for transmitting and receiving signals having a different frequency band;

first subtraction means for, when said first transmitting/receiving section is in a transmitting state and said second transmitting/receiving section is in a receiving state, subtracting an attenuated value from a received signal of said second transmitting/receiving section, said attenuated value being obtained by multiplying a transmission signal from said first transmitting/receiving section by a predetermined attenuation ratio; and second subtraction means for, when said second transmitting/receiving section is in a transmitting state and said first transmitting/receiving section is in a receiving state, subtracting an attenuated value from a received signal of said first transmitting/receiving section, said attenuated value being obtained by multiplying a transmission signal from said second transmitting/receiving section by the predetermined attenuation ratio.

* * * * *